United States Patent
Lennings et al.

(10) Patent No.: US 11,102,940 B2
(45) Date of Patent: Aug. 31, 2021

(54) FORESTRY MANAGEMENT DEVICE

(71) Applicant: HUSQVARNA AB, Huskvarna (SE)

(72) Inventors: Eric Lennings, Huskvarna (SE);
Mattias Rotstedt, Huskvarna (SE);
Alexander Persson, Tenhult (SE)

(73) Assignee: HUSQVARNA AB, Huskvarna (SE)

( * ) Notice: Subject to any disclaimer, the term of this patent is extended or adjusted under 35 U.S.C. 154(b) by 209 days.

(21) Appl. No.: 16/089,137

(22) PCT Filed: Mar. 29, 2017

(86) PCT No.: PCT/EP2017/057379
§ 371 (c)(1),
(2) Date: Sep. 27, 2018

(87) PCT Pub. No.: WO2017/167793
PCT Pub. Date: Oct. 5, 2017

(65) Prior Publication Data
US 2019/0090437 A1    Mar. 28, 2019

(30) Foreign Application Priority Data

Mar. 31, 2016 (SE) .................... 1650425-0

(51) Int. Cl.
  *G06Q 50/02* (2012.01)
  *A01G 23/099* (2006.01)
  *G06Q 10/06* (2012.01)
  *H04W 4/029* (2018.01)
  *G06F 16/29* (2019.01)

(52) U.S. Cl.
  CPC ........... *A01G 23/099* (2013.01); *G06F 16/29* (2019.01); *G06Q 10/063114* (2013.01); *G06Q 50/02* (2013.01); *H04W 4/029* (2018.02)

(58) Field of Classification Search
None
See application file for complete search history.

(56) References Cited

U.S. PATENT DOCUMENTS

2004/0112466 A1   6/2004  Roth et al.
2004/0250908 A1 * 12/2004  Hicks .................... A01G 23/00
                                               144/335

(Continued)

FOREIGN PATENT DOCUMENTS

| CA | 2 330 979 A1 | 8/2001 |
| CA | 2330979 A1 * | 8/2001 |
| JP | 2008-065720 A | 3/2008 |

OTHER PUBLICATIONS

Olberding et al. (A cuttable multi-touch sensor, UIST '13: Proceedings of the 26th annual ACM symposium on User interface software and technology, Oct. 2013, pp. 245-254, https://doi.org/10.1145/2501988.2502048).*

(Continued)

*Primary Examiner* — Matthew D Henry
(74) *Attorney, Agent, or Firm* — Burr & Forman, LLP (57) ABSTRACT

A forestry management device is provided including processing circuitry configured to receive an indication of a selected tree, receive selected tree location data associated with the selected tree, receive operator location data associated with an operator, and cause information associated with the selected tree to be displayed on a wearable computing device.

20 Claims, 5 Drawing Sheets

(56) References Cited

U.S. PATENT DOCUMENTS

| | | | | |
|---|---|---|---|---|
| 2005/0133115 | A1* | 6/2005 | Gatz | A01G 23/08 |
| | | | | 144/357 |
| 2006/0028330 | A1* | 2/2006 | Gallant | B60K 35/00 |
| | | | | 340/441 |
| 2012/0152072 | A1* | 6/2012 | Buchanan | F16P 3/147 |
| | | | | 83/58 |
| 2014/0316614 | A1* | 10/2014 | Newman | B64C 39/024 |
| | | | | 701/3 |

OTHER PUBLICATIONS

Griffiths, S., "Is this the silliest bike helmet ever made? Headwear 'for responsible cyclists' includes a licence plate and smart visor," Mail Online, Published Nov. 14, 2014, Retrieved from the Internet URL: http://www.dailymail.co.uk/sciencetech/article-2835027/Is-silliest-bike-helmet-Headwear-responsible-cyclists-includes-license-plate-smart-visor.html, on Apr. 2, 2015, pp. 1-14.

Haller, M. et al., "Emerging Technologies of Augmented Reality: Interfaces and Design," Idea Group Publishing, 2007, pp. 322-323.

Lammerman, M., et al., "MSc thesis subject: Forest Management Marteloscope as augmented reality," Retrieved from the Internet URL: https://www.wageningenur.nl/en/article/GRSthesis2014Lammeren4.htm, on Apr. 3, 2015, pp. 1-3.

Morais, C. D., "Smart Tree Logging with Remote Sensing," GIS Lounge, Oct. 21, 2014, Retrieved from the Internet URL: http://www.gislounge.com/smart-tree-logging-remote-sensing/, on Mar. 4, 2015, pp. 1-4.

Poirier, P.-A., "Visualizing Strategy," Academic Sep. 2008, in partnership with Komatsu Forest AB (Valmet), IDEO, SLU, and Oryx, Retrieved from the Internet URL: http://archive.papoirier.org/projects/visualizing_strategy.php, on Mar. 31, 2015, pp. 1-8.

Ranta, P., "Possibilities to Develop Forest Machine Simulator Based Education With Technology," 2004, Retrieved from the Internet URL: http://matriisi.ee.tut.fi/simumedia_www/Seminaari/Presentations/Ranta_presentation.pdf, on Oct. 9, 2018, pp. 1-18.

Ranta, P., "Possibilities to Develop Forest Machine Simulator Based Education with Technology," Retrieved from the Internet URL: http://matwww.ee.tut.fi/simumedia_www/Seminaari/Abstraktit/Simulator_research_technology_Ranta_101104.doc, on Oct. 9, 2018, pp. 1-4.

Rossman, J. and Moshammer, R., "Simulation in the Woods: From Remote Sensing Based Data Acquisition and Processing to Various Simulation Applications," Proceedings of the 2011 Winter Simulation Conference, S. Jain, R.R. Creasey, J. Himmelspach, K.P. White, and M. Fu, eds., © 2011 IEEE, pp. 984-996.

Rossman, Prof. Dr. J. et al., "Navigation of Mobile Robots in Natural Environments: Using Sensor Fusion in Forestry," Systemics, Cybernetics and Informatics, vol. 8, No. 3, 2010, pp. 67-71.

International Search Report and Written Opinion for International Application No. PCT/EP2017/057379 dated Jun. 9, 2017.

International Preliminary Report on Patentability for International Application No. PCT/EP2017/057379 dated Oct. 2, 2018.

\* cited by examiner

FORESTRY MANAGEMENT DEVICE

TECHNICAL FIELD

Example embodiments generally relate to forestry management and, more particularly, relate to a forestry management device configured to provide information associated with a selected tree on a wearable computing device.

BACKGROUND

Typically, thinning trees in a forest may be accomplished by cutting selected trees. Personnel may survey or chart the trees in the forest and select specific trees for cutting based on size, type, growth features, such as straightness, or the like. The selected tree may be marked on a physical site map, physically marked, or the like, to indicate the trees which have been selected for cutting. Loggers may locate and cut the trees using saws, harvesters, or the like.

BRIEF SUMMARY OF SOME EXAMPLES

In an example embodiment, a forestry management device is provided including processing circuitry configured to receive an indication of a selected tree, receive selected tree location data associated with the selected tree, receive operator location data associated with an operator from a wearable computing device, and cause information associated with the selected tree to be displayed on the wearable computing device based on the operator location data.

In another example embodiment, a forestry management system is provided including at least one wearable computing device and a forestry management device. The forestry management device may include processing circuitry configured to receive an indication of a selected tree, receive selected tree location data associated with the selected tree, receive operator location data associated with an operator from the at least one wearable computing device, and cause information associated with the selected tree to be displayed on a user interface of the at least one wearable computing device based on the operator location data.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

In an example embodiment, a forestry management device may be provided to cause an information associated with the selected tree to be displayed on a wearable device or wearable computing device, such as a helmet visor or safety glasses. In some example embodiments, the indication may include a virtual reality overlay. The forest management device may base the information associated with the selected tree on received location data and/or orientation data associated with the selected tree and an operator.

In an example embodiment, the forestry management device may receive location data associated with a plurality of trees including the selected tree. The forest management device may generate a tree map indicating the location of the selected tree and other trees. The tree map may be displayed on the wearable computing device.

In some example embodiments, the forestry management device may receive tree data associated with one or more trees, such as type, size growth features, or the like. The forestry management device may determine a felling direction based on the location of the selected tree, the location of other trees, the tree data, or the like. In some instances the forestry management device may determine a cutting position, e.g. a safe location for the operator to perform the cutting operation, based on the felling direction, tree data, selected tree location, other tree location or the like. The forestry management device of an example embodiment may determine a cutting location on the selected tree based on the tree data. The cutting location may include the height, angle, direction, or the like for the cutting operation. The felling direction, cutting position and/or the cutting location may be displayed on the wearable computing device.

In some example embodiments, the forestry management device may receive an indication of a worker location, e.g. another person in the cutting area. The forestry management device may compare the worker location to a safety threshold. The forestry management device may cause the worker location, safety thresholds, or a safety indication to be displayed on the wearable computing device. In some example embodiments, the safety indication may be displayed based on the worker location failing to satisfy the safety threshold.

Figure 1:
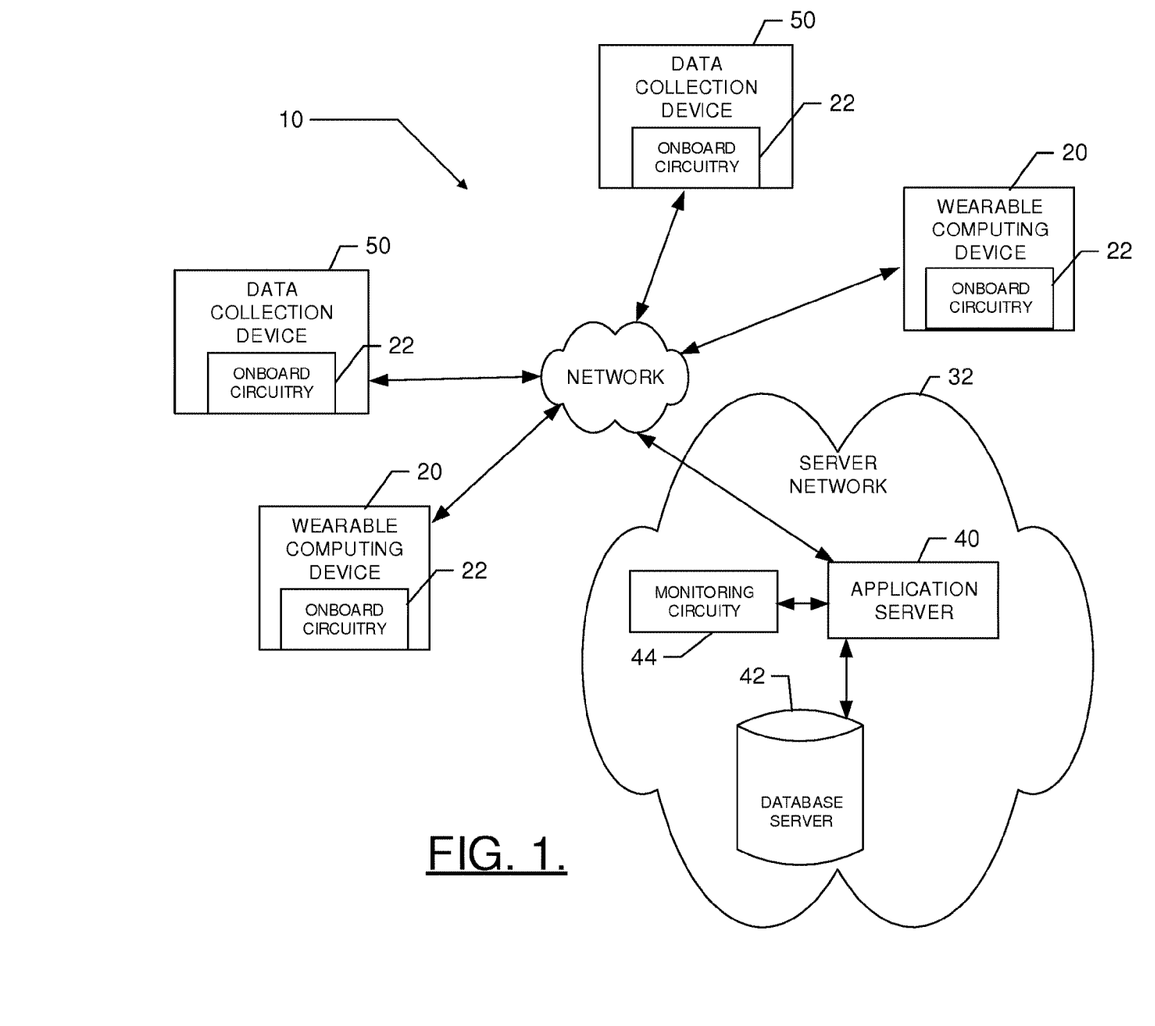
FIG. 1 illustrates a block diagram of a system according to an example embodiment.

FIG. 1 illustrates an example system in which an embodiment of the present invention may be employed. In this regard, FIG. 1 illustrates a generic example of a system in which various devices that are examples of construction equipment may utilize a network for the performance of forestry management according to an example embodiment. As shown in FIG. 1, a system 10 according to an example embodiment may include one or more client devices (e.g. wearable computing devices 20 and data collection devices 50). Notably, although FIG. 1 illustrates four devices 20, 50 it should be appreciated that many more devices 20, 50 may be included in some embodiments and thus, the four devices 20, 50 of FIG. 1 are simply used to illustrate a multiplicity of devices 20, 50 and the number of devices 20, 50 is in no way limiting to other example embodiments. In this regard, example embodiments are scalable to inclusion of any number of devices 20, 50 being tied into the system 10. Moreover, it should be appreciated that FIG. 1 illustrates one example embodiment in which shared resources may be allocated within a community of networked devices (e.g. devices 20, 50). However, it should be appreciated that the architecture of various example embodiments may vary. Thus, the example of FIG. 1 is merely provided for ease of explanation of one example embodiment and should not be considered to be limiting with respect to the architecture of the system 10. Accordingly, for example, some embodiments may have specific sets of devices 20, 50 that are associated with corresponding specific servers that belong to or are utilized by a particular organization, entity or group over a single network (e.g. network 30). However, in other embodiments, multiple different sets of devices 20, 50 may be enabled to access other servers associated with different organizations, entities or groups via the same or a different network.

The devices 20, 50 may, in some cases, each include sensory, computing and/or communication devices associated with different devices 20, 50 that belong to or are associated with a single organization. In another example, a first device 20, 50 may be associated with a first facility or location of a first organization. Meanwhile, a second device may be associated with a second facility or location of the first organization. As such, for example, some of the devices 20, 50 may be associated with the first organization, while other ones of the devices 20, 50 are associated with a second organization. Thus, for example, the devices 20, 50 may be remotely located from each other, collocated, or combinations thereof. However, in some embodiments, each of the devices 20, 50 may be associated with individuals, locations or entities associated with different organizations or merely representing individual devices.

Each of the wearable computing devices 20 may include a display visor on a safety helmet, glasses, goggles, or the like. The wearable computing devices 20 may include sensors for monitoring operator location, orientation, field of view, or the like, as discussed below in reference to FIG. 2.

Each of the data collection devices 50 may include satellite image capturing devices, ground or aerial drones, radar, LIDAR survey devices, or the like. In some example embodiments, the data collection devices 50 may include a tablet computer, personal digital assistant, smart phone, smart watch or the like. The data collection devices 50 may include sensors or a sensor network, such as location sensors, cameras, scanners, or the like and/or a user interface, as discussed below in reference to FIG. 2. In an example embodiment, the sensors may be associated with chainsaws, harvesters, or the like.

In an example embodiment, each of the devices 20, 50 may include onboard circuitry 22 which may include or otherwise be embodied as a computing device (e.g. a processor, microcontroller, processing circuitry, or the like) capable of communication with a network 30. As such, for example, each one of the devices 20, 50 may include (or otherwise have access to) memory for storing instructions or applications for the performance of various functions and a corresponding processor for executing stored instructions or applications and a corresponding processor or processing circuitry. Each one of the devices 20, 50 may also include software and/or corresponding hardware (e.g. the onboard circuitry 22) for enabling the performance of the respective functions of the clients as described below. In an example embodiment, one or more of the devices 20, 50 may be configured to execute applications or functions implemented via software for enabling a respective one of the devices 20, 50 to communicate with the network 30 for requesting and/or receiving information and/or services via the network 30 and/or for providing data to other devices via the network 30. The information or services receivable at the devices 20, 50 may include deliverable components (e.g. downloadable software to configure the onboard circuitry 22 of the devices 20, 50, or information for consumption or utilization at the onboard circuitry 22 of the devices 20, 50).

The network 30 may be a data network, such as a local area network (LAN), a metropolitan area network (MAN), a wide area network (WAN) (e.g. the Internet), and/or the like, which may couple the devices 20, 50 to devices such as processing elements (e.g. personal computers, server computers or the like) and/or databases. Communication between the network 30, the devices 20, 50 and the devices or databases (e.g. servers) to which the devices 20, 50 are coupled may be accomplished by either wired or wireless communication mechanisms and corresponding communication protocols.

In an example embodiment, other devices to which the devices 20, 50 may be coupled via the network 30 may include a server network 32 including one or more application servers (e.g. application server 40), and/or a database server 42, which together may form respective elements of the server network 32. Although the application server 40 and the database server 42 are each referred to as "servers," this does not necessarily imply that they are embodied on separate servers or devices. As such, for example, a single server or device may include both entities and the database server 42 could merely be represented by a database or group of databases physically located on the same server or device as the application server 40. The application server 40 may include monitoring circuitry 44 (which may be similar to or different from the onboard circuitry 22 of the devices 20, 50) that may include hardware and/or software for configuring the application server 40 to perform various functions. As such, for example, the application server 40 may include processing logic and memory enabling the application server 40 to access and/or execute stored computer readable instructions for performing various functions.

In an example embodiment, one function that may be provided by the application server 40 (e.g. via the monitoring circuitry 44) may be the provision of services relating to causing information associated with the selected tree to be displayed on a wearable computing device, as will be described in greater detail below. For example, the application server 40 may be local or remote and configured to receive data from the devices 20, 50 and process the data to coordinate forestry management operations, as described herein. Thus, for example, the onboard circuitry 22 may be configured to send the data to the application server 40 for the application server 40 to coordinate forestry management operations, or have actions associated therewith (e.g. send information, alerts, or safety interlocks to devices 20, 50). In some embodiments, the application server 40 may be configured to provide devices 20, 50 with instructions (e.g. for execution by the onboard circuitry 22) for taking prescribed actions when corresponding control data is received or safety interlocks are met.

Figure 2:
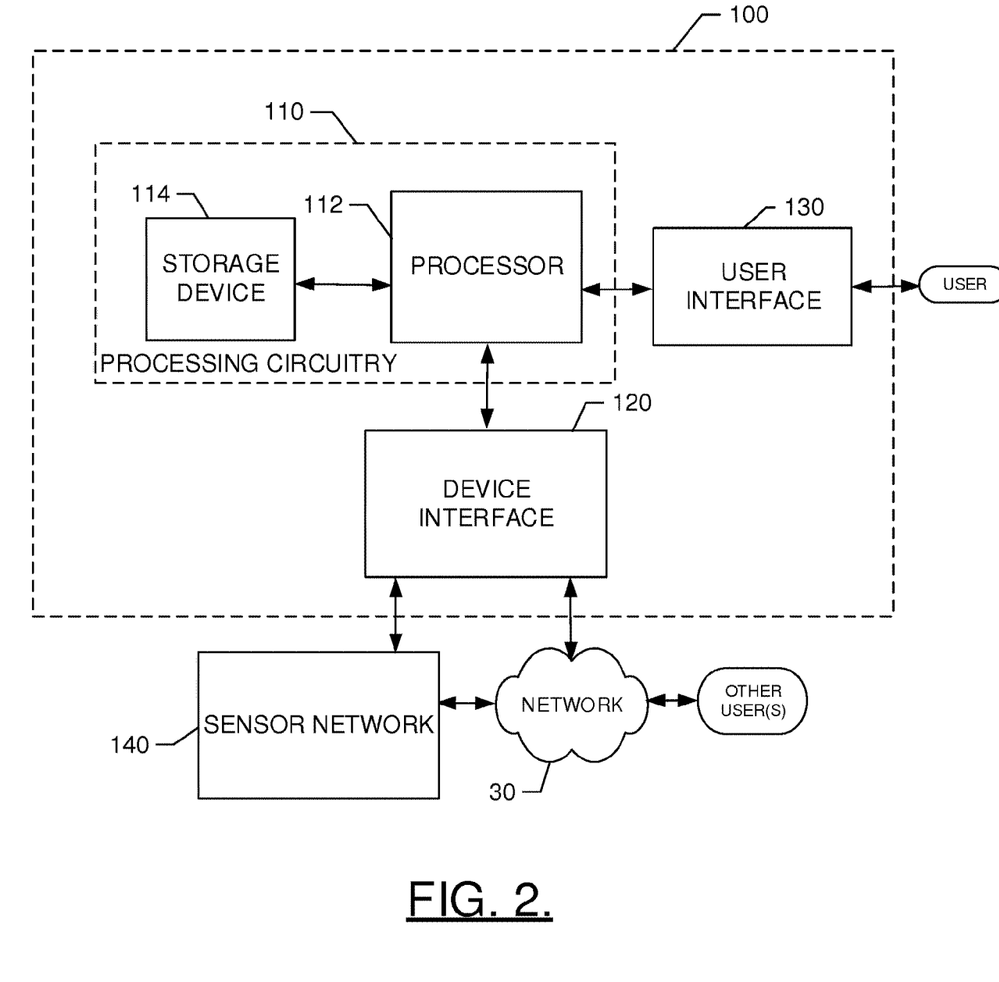
FIG. 2 illustrates a block diagram of one example of onboard electronics or processing circuitry that may be used in connection with employment of an example embodiment.

The system 10 of FIG. 1 may make adjustments to device 20, 50 configurations on the basis of the execution of functionality that is executed using either or both of the onboard circuitry 22 and the monitoring circuitry 44. FIG. 2 illustrates a block diagram showing components that may be associated with embodiment of the onboard circuitry 22 and/or the monitoring circuitry 44 according to an example embodiment. As shown in FIG. 2, the onboard circuitry 22 and/or the monitoring circuitry 44 may include or otherwise be embodied as a forestry management device 100. The forestry management device 100 may be embodied in a wearable computing device 20, a data collection device 50, a separate computing device, or be distributed among the devices 20, 50, the application server 40, and/or a separate computing device. The forestry management device 100 may include processing circuitry 110 of an example embodiment, as described herein. In this regard, for example, the forestry management device 100 may utilize the processing circuitry 110 to provide electronic control inputs to one or more functional units of the onboard circuitry 22 and/or the monitoring circuitry 44 and to process data generated by the one or more functional units regarding various indications of device activity (e.g. operational parameters and/or location information) relating to a corresponding one of the devices 20, 50. In some cases, the processing circuitry 110 may be configured to perform data processing, control function execution and/or other processing and management services according to an example embodiment. In some embodiments, the processing circuitry 110 may be embodied as a chip or chip set. In other words, the processing circuitry 110 may comprise one or more physical packages (e.g. chips) including materials, components and/or wires on a structural assembly (e.g. a baseboard). The structural assembly may provide physical strength, conservation of size, and/or limitation of electrical interaction for component circuitry included thereon. The processing circuitry 110 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 110 may include one or more instances of a processor 112 and memory 114 that may be in communication with or otherwise control a device interface 120 and, in some cases, a user interface 130. As such, the processing circuitry 110 may be embodied as a circuit chip (e.g. an integrated circuit chip) configured (e.g. with hardware, software or a combination of hardware and software) to perform operations described herein. However, in some embodiments, the processing circuitry 110 may be embodied as a portion of an on-board computer on a device being monitored (e.g. one of the devices 20, 50), while in other embodiments, the processing circuitry 110 may be embodied as a remote computer that monitors device activity for one or more devices.

The user interface 130 may be in communication with the processing circuitry 110 to receive an indication of a user input at the user interface 130 and/or to provide an audible, visual, tactile or other output to the user. As such, the user interface 130 may include, for example, a display, one or more levers, switches, buttons or keys (e.g. function buttons), and/or other input/output mechanisms, in an example embodiment, the display may include the field of view or a portion of the field of view of a wearable computing device 20, such as goggles, safety glasses, or safety helmet visor. In an example embodiment, the user interface 130 may include one or a plurality of lights, a display, a speaker, a tone generator, a vibration unit and/or the like.

The device interface 120 may include one or more interface mechanisms for enabling communication with other devices (e.g. sensors of a sensor network 140, or functional units of the forestry management device 100 or other equipment on which an example embodiment may be employed). In some cases, the device interface 120 may be any means such as a device or circuitry embodied in either hardware, or a combination of hardware and software that is configured to receive and/or transmit data from/to sensors in communication with the processing circuitry 110 via internal communication systems of the forestry management device 100. In some cases, the device interface 120 may further include wireless communication equipment (e.g. a one way or two way radio) for at least communicating information from the forestry management device 100 to a network and, in the case of a two way radio, in some cases receiving information from the network.

The processor 112 may be embodied in a number of different ways. For example, the processor 112 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 112 may be configured to execute instructions stored in the memory 114 or otherwise accessible to the processor 112. As such, whether configured by hardware or by a combination of hardware and software, the processor 112 may represent an entity (e.g. physically embodied in circuitry—in the form of processing circuitry 110) capable of performing operations according to embodiments of the present invention while configured accordingly. Thus, for example, when the processor 112 is embodied as an ASIC, FPGA or the like, the processor 112 may be specifically configured hardware for conducting the operations described herein. Alternatively, as another example, when the processor 112 is embodied as an executor of software instructions, the instructions may specifically configure the processor 112 to perform the operations described herein.

In an example embodiment, the processor 112 (or the processing circuitry 110) may be embodied as, include or otherwise control the operation of the forestry management device 100 based on inputs received by the processing circuitry 110. As such, in some embodiments, the processor 112 (or the processing circuitry 110) may be said to cause each of the operations described in connection with the forestry management device 100 in relation to operation the forestry management device 100 relative to undertaking the corresponding functionalities associated therewith responsive to execution of instructions or algorithms configuring the processor 112 (or processing circuitry 110) accordingly.

In an example embodiment, the memory 114 may include one or more non-transitory memory devices such as, for example, volatile and/or non-volatile memory that may be either fixed or removable. The memory 114 may be configured to store information, data, applications, instructions or the like for enabling the processing circuitry 110 to carry out various functions in accordance with example embodiments of the present invention. For example, the memory 114 could be configured to buffer input data for processing by the processor 112. Additionally or alternatively, the memory 114 could be configured to store instructions for execution by the processor 112. As yet another alternative or additional capability, the memory 114 may include one or more databases that may store a variety of data sets responsive to input from the sensor network 140, the forestry management device 100, or any other functional units that may be associated with the forestry management device 100. Among the contents of the memory 114, applications may be stored for execution by the processor 112 in order to carry out the functionality associated with each respective application.

In some embodiments, the processing circuitry 110 may communicate with electronic components and/or sensors of the sensor network 140 (e.g. sensors that measure variable values related to device location, orientation, field of view, and/or environment, such as tree data, and/or the like, and/or sensors that measure device movement employing movement sensor circuitry) of the device 20, 50 via the device interface 120. In one embodiment, sensors of a sensor network 140 of one or more ones of the devices 20, 50 may communicate with the processing circuitry 110 of a remote monitoring computer via the network 30 and the device interface 120 using wireless communication or by downloading data that is transferred using a removable memory device that is first in communication with the construction device 20 to load data indicative of device activity, and is then (e.g. via the device interface 120) in communication with the remote monitoring computer (e.g. associated with the monitoring circuitry 44).

In some embodiments, the processing circuitry 110 may communicate with movement sensor circuitry of the devices 20, 50 (e.g. when the processing circuitry 110 is implemented as the onboard circuitry 22), or may receive information indicative of device location from movement sensor circuitry of one or more devices being monitored (e.g. when the processing circuitry is implemented as the monitoring circuitry 44). The movement sensor circuitry may include movement sensors (e.g. portions of the sensor network 140) such as one or more accelerometers and/or gyroscopes, or may include global positioning system (GPS) or other location determining equipment.

The movement sensor circuitry (if employed) may be configured to provide indications of movement of the devices 20, 50 based on data provided by the one or more accelerometers and/or gyroscopes, and/or based on GPS or local position determining capabilities. In other words, the movement sensor circuitry may be configured to detect movement of the devices 20, 50 based on inertia-related measurements or other location determining information. In some example embodiments, the movement sensor circuitry may include orientation sensors, configured to detect the orientation of a device, such as the orientation and/or field of view of the wearable computing device 20, relative to the determined location or a reference point/structure at the determined location.

Figure 3:
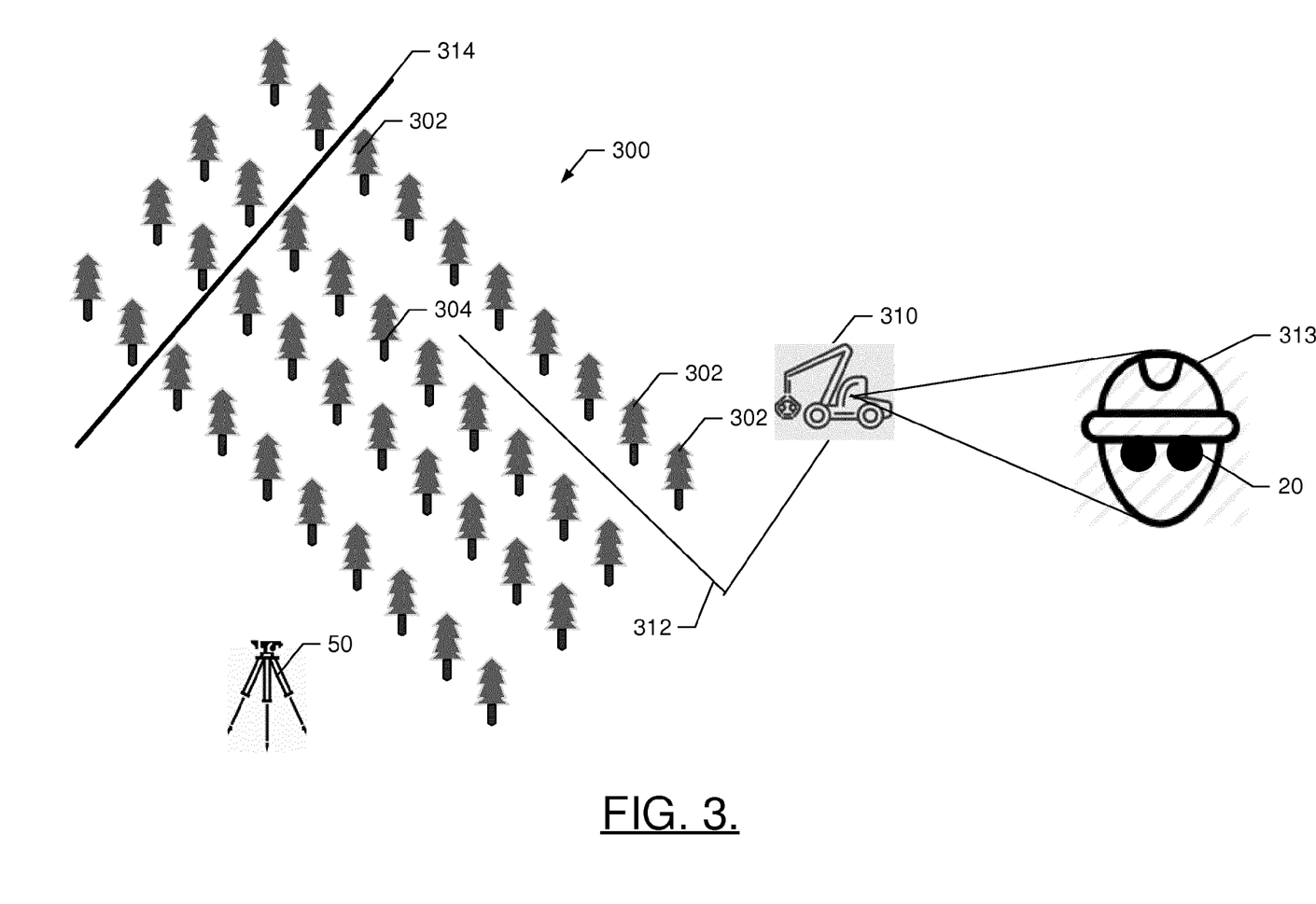
FIG. 3 illustrates a concept diagram of operation of the system in relation to a forest according to an example embodiment.

FIG. 3 illustrates a concept diagram of operation of the system in relation to a forest 300 according to an example embodiment. The forest 300 may be any area including one or more trees 302 which may be cut for harvesting, thinning, conservation, or the like. In an example embodiment, one or more data collection devices 50 may receive tree data, from one or more sensors, such as a portion of the sensor network 140. The data collection devices 50 may include satellite image capturing devices, ground based drones, aerial drones, survey devices, or the like. The sensors may include an aerial imager or ground based imager, such as captured by a still or motion camera, a radar, LIDAR, or the like. The data captured by the sensors may be used to generate a two dimensional or three dimensional model of the forest 300. The data collection device 50, or the forest management device 100, may determine the tree data based on the two dimensional or three dimensional model. The tree data may include the tree type; tree dimensions, such as height, circumference, diameter; growth features, such as branches, angles of growth, or the like; or any other data associated with one or more of the trees 302 in the forest 300.

The forest management device 100 may receive an indication of a selected tree 304. The forest management device 100 may identify one or more selected trees 304 automatically, based on tree data, such as a specified type and height, or manually based on user input identifying selected tree 304, such as via the user interface 130. For example, the forest management device 100 may receive the indication of a selected tree 304 based on a user identifying, e.g. marking" the selected tree 304 with the data collection device 50 or wearable computing device 20 user interface 130. Location data and orientation data indicative of an area proximate to the data collection device 50 or wearable computing device 20 may be received by the forest management device 100 and be utilized as selected tree location data.

The forestry management device 100 may receive selected tree location data associated with the selected tree 304. The selected tree location data may be an actual location, such as a set of GPS coordinates, or an approximate location, derived from location sensors, such as a portion of the sensor network 140, or associated with a reference point identified by the data collection device 50.

The forest management device 100 may also receive operator location data associated with an operator 313. The operator location data may include location, orientation, and/or field of view. The operator location may be an actual location or an approximate location derived from location sensors, such as a portion of the sensor network 140. The orientation may include the direction the operator 313 is facing. The field of view may be the determined based on the orientation of the operator 313, or a captured image from the wearable computing device 20.

In an example embodiment, the forestry management device 100 may cause information associated with the selected tree 304 to be displayed on the user interface 130 of the wearable computing device 20. The information associated with the selected tree 304 may include a visual overlay in the field of view of the operator 313, e.g. augmented reality, for example, a projection in the field of view of the wearable computing device 20, such as a visor or glasses. In an embodiment, in which the wearable computing device 20 includes a camera to capture an image, the information associated with the selected tree 304 may be overlaid on the captured image as displayed on the user interface 130 of the wearable computing device 20. The information associated with the selected tree 304 may include highlighting, outlining, or otherwise contrasting the selected tree 304 from other areas of the field of view, such as other trees 302, as depicted in user interface display 400 depicted in FIG. 4A. In an example embodiment, the information associated with the selected tree 304 may be pushed to a heads-up display.

In an example embodiment, the forestry management device 100 may receive other tree location data associated with other trees 302 of the forest 300. The other tree location data may be an actual location or proximate location of the other trees derived from sensor data, such as a portion of the sensor network 140. The forest management device 100 may generate a tree map including at least the selected tree 304 and one or more other trees 302. In an example embodiment, the forest management device 100 may generate a suggested route 312 from a current operator location to the selected tree 304. The suggested route 312 may be particularly useful in an example in which a harvester 310 or other vehicle may traverse the forest 300. In some example embodiments, the forest management device 100 may cause the tree map and/or the suggested 312 route to be displayed on the user interface 130 of the wearable computing device 20.

In an example embodiment, the forestry management device 100 may receive forest boundary data 314, such as a designated cutting area, property lines, roads, or the like. The forestry management device 100 may cause the boundary data 314 to be displayed on the user interface 130, such as a portion of or in association with the tree map. The boundary data 314 may be used in the determination of a felling direction, as discussed below, to prevent felling of trees outside of the boundary or across roads.

Figure 4A:
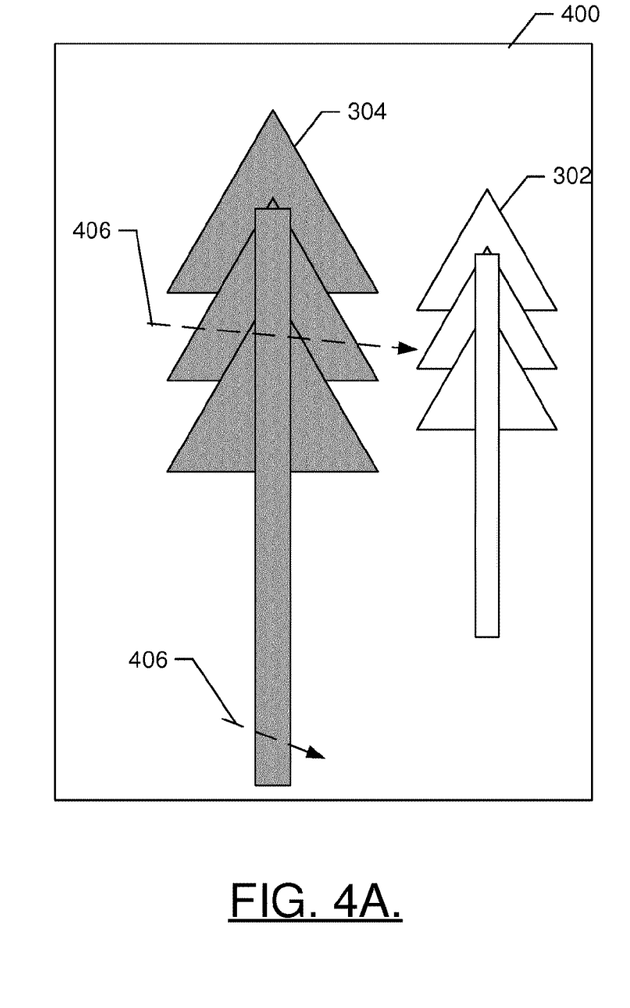
FIGS. 4A and 4B illustrate user interface displays according to example embodiments.
Figure 4B:
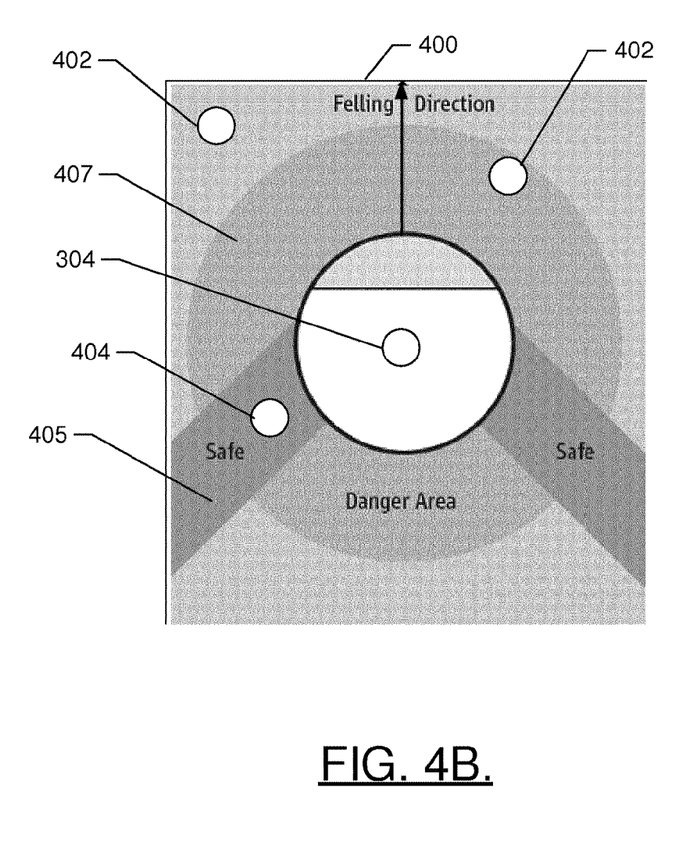

Turning to the example user interface displays 400 of FIGS. 4A and 4B, the forestry management device 100 may determine a felling direction. The felling direction may be based on the location of the selected tree 304, the location of the other trees 302, the tree data associated with the selected tree 304, or the like. In an example embodiment, the selected tree may be highlighted in a first color, such as red, and other trees 302 may be highlighted in a second color, such as green, to differentiate the selected tree 304 form the other trees 302 and surrounding objects. Additionally or alternatively, the selected tree 304 may be differentiated from the surrounding objects by bolding, blinking, focus, or the like. The user interface display 400 may include information associated with the selected tree 304 and the felling direction, as depicted in FIG. 4B.

In some example embodiments, the forest management device 100 may determine a cutting position 405. The cutting position 405 may be a safe position for the operator 313 to occupy during the cutting operation based on the felling direction, selected tree location, other tree location, tree data associated with the selected tree 304, or the like. The forest management device 100 may cause the cutting position 405 to be displayed on the user interface 130. Additionally in some embodiments, the forestry management device 100 may cause the operator location data 404 to be displayed in relation to the selected tree 302, the felling direction, and/or the cutting position 405.

In some example embodiments, the forestry management device 100 may receive worker location data 402 associated with one or more workers, e.g. persons other than the operator 313 within the forest 300. The worker location data 402 may be substantially similar to the operator location data 404. Additionally or alternatively, the forest management device 100 may receive ultra wide band (UWB) or other radio based ranging for use as worker location data 402. The forestry management device 100 may cause the worker location data 402 to be displayed on the user interface 130 of the wearable computing device 20. In an example embodiment, the forestry management device 100 may determine a predetermined safety threshold 407. The predetermined safety threshold 407 may include one or more areas, which may be unsafe during the cutting operation, e.g. the selected tree 304 may fall or debris from the selected tree 304 may fall in these areas. The predetermined safety threshold 407 may be based on the location of the selected tree 304, the location of the other trees 302, tree data, felling direction, of the like. In some example embodiments, the forest management device 100 may cause the predetermined safety threshold 407 to be displayed on the user interface 130 of the wearable computing device 20.

In an example embodiment, the forestry management device 100 may cause received input from the user interface 130 to adjust the felling direction. The user optimization of the felling direction may allow for better ergonomics for an operator, accessibility of a harvester and/or a forwarder.

In an example embodiment, the forestry management device 100 may define the predetermined safety threshold area by generating a geometric shape around a reference point, e.g. the selected tree 304. The geometric shape may be a circle, a square, polygon or the like. The predetermined safety threshold may be determined based on tree data associated with the selected tree, such as type of tree, height, circumference, diameter, growth features, or the like. In some example embodiments, the predetermined safety threshold may also account for topology, such as hills which may cause a felled tree to roll. The forestry management device 100 may define additional area in the predetermined safety threshold to prevent injury from a rolling tree.

Additionally or alternatively, in some example embodiments, the forestry management device 100 may compare the worker location data 402 to the predetermined safety threshold 407. The forestry management device 100 may cause a safety indication to be displayed on the user interface 130 of the wearable computing device 20, in an instance in which worker location data fails to satisfy the predetermined safety threshold 407, e.g. is within the unsafe area. The safety indication may include a warning dialog box, a flashing light, highlighting the worker location data, or the like.

Returning to the user interface display 400 depicted in FIG. 4A, the forestry management device 100 may determine one or more cutting locations 406 on the selected tree 304. The cutting location 406 may include the height, angle direction or the like of a cutting operation of the selected tree 304. The cutting location 406 may be based on the selected tree 304, location data, location data for other trees 302, tree data, felling direction or the like. The forest management device 100 may cause the cutting location 406 to be displayed on the user interface 130 of the wearable computing device 20. In one example embodiment, the cutting location 406 may include a cutting line overlaid on the selected tree 304 in the field of view.

In an example embodiment the forestry management device 100 may receive preferred lumber dimension data, indicative of a customer request or high value lumber products, including wood type, length, width, thickness, or the like. The selected tree 304 and/or the cut locations may be determined or adjusted based on the preferred lumber data to allow for the selected tree 304 to be harvested to meet the specifications of the preferred lumber dimension data.

Figure 5:
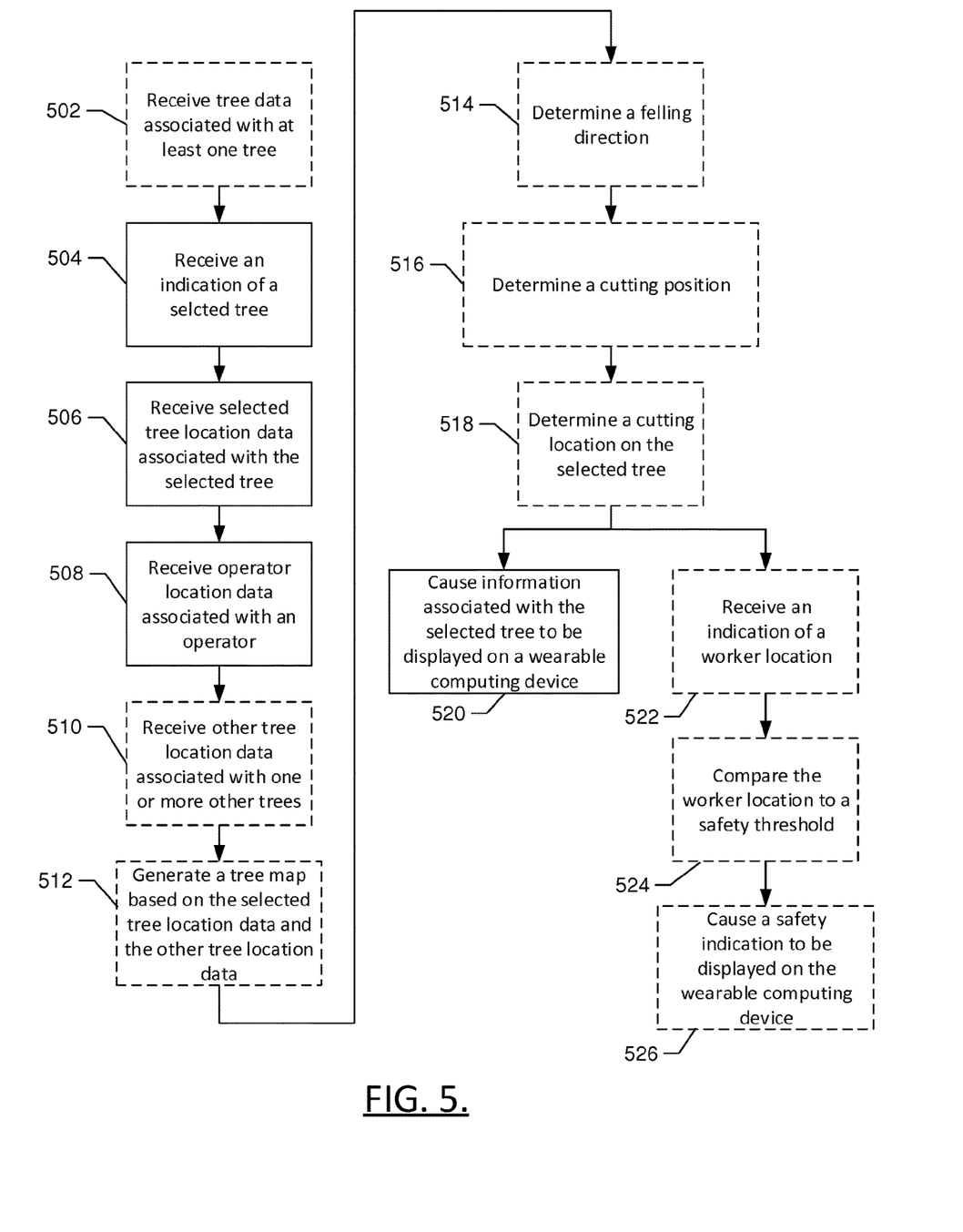
FIG. 5 illustrates a block diagram of a method according to an example embodiment.

In some cases, a method of utilizing a forestry management device 100 and/or one or more wearable computing devices 20 according to an example embodiment may be provided. FIG. 5 illustrates a block diagram of some activities that may be associated with one example of such a method. In some embodiments, the processing circuitry 110 (which may include a processor capable of executing instructions stored in a non-transitory computer readable medium/memory) may be configured to implement a control algorithm for the forestry management device 100 and/or the one or more wearable computing devices 20 according to the method.

In an example embodiment, the method may receiving an indication of a selected tree at operation 504, receiving selected tree location data associated with the selected tree at operation 506, receiving operator location data associated with an operator at operation 508, and causing information associated with the selected tree to be displayed on a wearable computing device at operation 520.

In some embodiments, the method may include additional, optional operations, and/or the operations described above may be modified or augmented. Some examples of modifications, optional operations, and augmentations are described below, as indicated by dashed lines. In an example embodiment, the method may include receiving tree data associated with at least one tree at operation 502, receiving other tree location data associated with one or more other trees at operation 510, and generating a tree map based on the selected tree location and the other tree location data at operation 512. In some example embodiments, the method may include determining a felling direction at operation 514, determining a cutting position at operation 516, and determining a cutting location on the selected tree at operation 518. The method may also include, in some example embodiments, receiving an indication of a worker location at operation 522, comparing the worker location to a safety threshold at operation 524, and causing a safety indication to be displayed on the wearable computing device at operation 526.

In an example embodiment, the forestry management device 100 may comprise a processor (e.g. the processor 112) or processing circuitry 110 configured to perform some or each of the operations (502-526) described above. The processor 112 may, for example, be configured to perform the operations (502-526) by performing hardware implemented logical functions, executing stored instructions, or executing algorithms for performing each of the operations. In some embodiments, the processor 112 or processing circuitry 110 may be further configured for additional operations or optional modifications to operations 502-526. In this regard, for example, the processing circuitry is further configured to receive tree data associated with at least one tree. In an example embodiment, the processing circuitry is further configured to receive other tree location data associated with at least one other tree and generate a tree map based on the selected tree location data and the other tree location data. In some example embodiments, the processing circuitry is further configured to determine a felling direction for the selected tree and the information associated with the selected tree includes the felling direction. In an example embodiment, the processing circuitry is further configured to determine a cutting position for the operator and the information associated with the selected tree includes the cutting position. In some example embodiments, the processing circuitry is further configured to determine a cutting location on the selected tree and the information associated with the selected tree includes the cutting location. In an example embodiment, the processing circuitry is further configured to receive an indication of a worker location and the information associated with the selected tree includes an indication of the worker location. In some example embodiments, the information associated with the selected tree includes a safety threshold. In an example embodiment, the processing circuitry is further configured to compare the worker location to the safety threshold.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A forestry management device comprising processing circuitry configured to:
   receive an indication of a selected tree;
   receive selected tree location data associated with the selected tree;
   receive operator location data associated with an operator from a location sensor of a wearable computing device, the wearable computing device comprising a head-mounted display; and
   cause information associated with the selected tree to be displayed on the head-mounted display of the wearable computing device based on the operator location data, the information associated with the selected tree comprising cutting information for use by the operator to cut the selected tree;
   wherein the cutting information is displayed via augmented reality as part of a visual overlay projection on the selected tree and a field of view of the operator.

2. The forestry management device of claim 1, wherein the processing circuitry is further configured to:
   receive tree data associated with the selected tree, the tree data being generated based on an image of the selected tree captured by an imager of a data collection device, the indication of the selected tree being based on the tree data.

3. The forestry management device of claim 1, wherein the processing circuitry is further configured to:
   determine a felling direction for the selected tree, wherein the cutting information includes the felling direction;
   wherein an indication of the felling direction is displayed via augmented reality as part of the visual overlay projection in association with the selected tree and the field of view of the operator.

4. The forestry management device of claim 1, wherein the processing circuitry is further configured to:
   determine a cutting position for the operator, wherein the cutting information includes the cutting position;
   wherein an indication of the cutting position for the operator is displayed via augmented reality as part of the visual overlay projection in association with the selected tree and the field of view of the operator.

5. The forestry management device of claim 1, wherein the processing circuitry is further configured to:
   determine a cutting location on the selected tree, wherein the cutting information includes the cutting location;
   wherein an indication of the cutting location is displayed via augmented reality as part of the visual overlay projection on the selected tree and the field of view of the operator.

6. The forestry management device of claim 1, wherein the processing circuitry is further configured to:

receive an indication of a worker location, wherein the information associated with the selected tree includes an indication of the worker location.

7. The forestry management device of claim 6, wherein the information associated with the selected tree includes a safety threshold.

8. The forestry management device of claim 7, wherein the processing circuitry is further configured to:
compare the worker location to the safety threshold.

9. The forestry management device of claim 8, wherein the processing circuitry is further configured to:
cause a safety indication to be displayed on the wearable computing device via augmented reality as part of the visual overlay projection on the field of view of the operator in response to failing to satisfy the safety threshold.

10. A forestry management system comprising:
a wearable computing device comprising a location sensor and a head-mounted display; and
a forestry management device comprising processing circuitry configured to:
receive an indication of a selected tree;
receive selected tree location data associated with the selected tree;
receive operator location data associated with an operator from the location sensor of the wearable computing device; and
cause information associated with the selected tree to be displayed on the head-mounted display of the wearable computing device based on the operator location data, the information associated with the selected tree comprising cutting information for use by the operator to cut the selected tree;
wherein the cutting information is displayed via augmented reality as part of a visual overlay projection on the selected tree and a field of view of the operator.

11. The forestry management system of claim 10, wherein the processing circuitry is further configured to:
receive tree data associated with the selected tree, the tree data being generated based on an image of the selected tree captured by an imager of a data collection device, the indication of the selected tree being based on the tree data.

12. The forestry management system of claim 10, wherein the processing circuitry is further configured to:
receive other tree location data associated with at least one other tree; and
generate a tree map based on the selected tree location data and the other tree location data.

13. The forestry management system of claim 10, wherein the processing circuitry is further configured to:
determine a felling direction for the selected tree, wherein the cutting information includes the felling direction;
wherein an indication of the felling direction is displayed via augmented reality as part of the visual overlay projection in association with the selected tree and the field of view of the operator; and
wherein the processing circuitry is further configured to receive and cause display of forest boundary data indicating a designated cutting area or property lines via augmented reality as part of the visual overlay projection.

14. The forestry management system of claim 10, wherein the processing circuitry is further configured to:
determine a cutting position for the operator, wherein the cutting information includes the cutting position;
wherein an indication of the cutting position for the operator is displayed via augmented reality as part of the visual overlay projection in association with the selected tree and the field of view of the operator.

15. The forestry management system of claim 10, wherein the processing circuitry is further configured to:
determine a cutting location on the selected tree, wherein the cutting information includes the cutting location;
wherein an indication of the cutting location is displayed via augmented reality as part of the visual overlay projection on the selected tree and the field of view of the operator.

16. The forestry management system of claim 10, wherein the processing circuitry is further configured to:
receive an indication of a worker location, wherein the information associated with the selected tree includes an indication of the worker location; and
compare the worker location to a safety threshold and cause a safety indication to be displayed on the wearable computing device via augmented reality as part of the visual overlay projection on the field of view of the operator in response to failing to satisfy the safety threshold.

17. The forestry management system of claim 10, wherein the head-mounted display is provided on a safety helmet visor.

18. The forestry management system of claim 10 further comprising a data collection device that comprises an aerial drone, the aerial drone comprising an imager configured to capture an image of the selected tree;
wherein the indication of the selected tree is based on tree data, the tree data being based on the image of the selected tree.

19. The forestry management system of claim 10, wherein the wearable computing device comprises a camera for capturing images of the field of view of the operator for rendering the visual overlay projection on the captured images of the field of view of the operator.

20. The forestry management system of claim 10, wherein the processing circuitry is configured to cause the indication of the selected tree to be rendered as highlighting, outlining, or contrasting the selected tree as part of the visual overlay projection.

* * * * *